United States Patent

[11] 3,602,957

[72] Inventor Robert S. Chang
6600 Monte Verde Road, El Sobrante,
Calif. 94803
[21] Appl. No. 865,409
[22] Filed Oct. 10, 1969
[45] Patented Sept. 7, 1971

[54] ELASTIC HOOK BAND
5 Claims, 6 Drawing Figs.

[52] U.S. Cl. ........................................................ 24/16 PB
[51] Int. Cl. .................................................... B65d 63/00
[50] Field of Search ............................................ 24/16 PB,
17 B; 132/46 R; 24/16 PB, 17 B, 17 A

[56] References Cited
UNITED STATES PATENTS
913,962  3/1909  Liddy .......................... 24/17 A
1,797,539  3/1931  Arthur .......................... 24/16 PB
2,092,711  9/1937  Ashton .......................... 24/16 PB
2,699,585  1/1955  Patterson ...................... 24/16 PB
3,048,906  8/1962  Patterson ...................... 24/16 PB
3,261,066  7/1966  Chamberlin .................... 24/16 R
3,331,105  7/1967  Gordon .......................... 24/16 PB Primary Examiner—Donald A. Griffin
Attorney—Gregg & Hendricson ABSTRACT: An elastic loop or band having a metal or plastic element in the form of or formable into a hook extending from an outer surface thereof whereby the loop is extensible about one or more members to be held together and is attachable to itself without requiring extension over the ends of such members.

PATENTED SEP 7 1971  3,602,957

INVENTOR
ROBERT S. CHANG
BY Gregg & Henderson
ATTORNEYS 3,602,957

ELASTIC HOOK BAND

BACKGROUND OF INVENTION

Elastic loops or rubber bands, as same are commonly termed, are well known in the art and are widely employed to hold together a wide variety of different elements. Such loops or bands find wide application but in general are limited to circumstances wherein they may be extended over one end of the elements to be held together. There are many applications wherein it would be desirable to employ an elastic connector of this general type but which do not admit of extension over the ends of the elements to be joined thereby.

In order to overcome the general problem noted above there have been developed a number of tying and fastening devices dating at least as far back as U.S. Pat. Nos. 913,962 and 1,057,156. A plurality of subsequent improvements in this field have been advanced by H. W. Patterson, as shown in a plurality of U.S. patents including U.S. Pat. No. 2,648,879 and U.S. Pat. No. 3,048,906, as well as additional intervening patents. The direction of development, at least as exemplified by the above identified patents, appears to be in the direction of the provision of some type of additional rubber portion upon a rubber band. Such additional portions vary considerably in configuration and manner of utilization but each appear to incorporate one or more rubber knobs or extensions adapted to cooperate with each other or possible even with an opposite side of a rubber band to complete the closure or fastening.

While the developments in this general field certainly appear advantageous it has been found that the acceptance of same has been limited. Even in those fields of endeavor or industries wherein the tying or fastening device of this general type would be undoubtedly advantageous it appears that little use is made of known devices of this type. One possible difficulty with prior art devices of this general nature is the ultimate cost thereof and at least various devices of this general nature incorporate undue complexity both in manufacture and utilization.

The present invention provides an improvement in the general field identified above wherein a limited flexible extension is provided from the outer surface of one side of an endless loop of resilient material. This extension, preferably formed of metal, is adapted to be bend during a fastening operation to thereby hook over an opposite end of the endless loop wrapped about elements to be fastened or tied together.

SUMMARY OF INVENTION

The present invention provides a simple resilient fastening or tying device incorporating an endless loop of resilient material such as rubber. The basic portion of the present invention is commonly denominated as a rubber band and while same finds widespread utilization in a variety of fields, it is accepted that same is generally inapplicable for situations wherein the band itself cannot be slipped over the end of elements to be held together thereby. This invention incorporates, with the above noted loop of resilient material, an outward projection formed of a limitedly flexible material such as a thin strip or rod which may be bent or deformed into a hook or closed loop about the opposite side of the resilient loop or band after the band is stretched about elements to be secured together.

DESCRIPTION OF FIGURES

The present invention is illustrated as to a single preferred embodiment thereof in the accompanying drawing wherein.

DESCRIPTION OF PREFERRED EMBODIMENT

Figure 1:
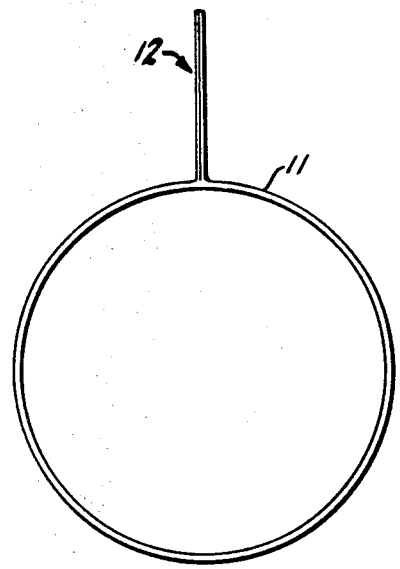
FIG. 1 is a plan view of an endless elastic loop or band with an extension from one outer surface thereof in accordance with the present invention.
Figure 2:
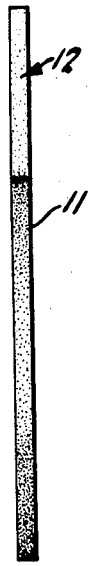
FIG. 2 is a side view of the unit of FIG. 1.

The present invention as shown in the drawings is simply constituted as an endless loop or band 11 of elastic material such as rubber, for example, and a thin elongated strip or extension 12 of limitedly deformable material extending from an outer surface of the band 11. The elastic loop or band 11 may be formed of any desired diameter or dimension depending upon the intended use thereof and, as noted above, is preferably formed of rubber or the like so as to be extensible. The strip or extension 12 includes a substantially rigid metal strip or rod 13 which may be bent by hand pressure into a hook or loop to remain so bent.

Figure 3:
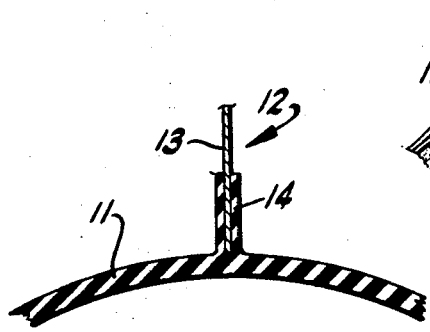
FIG. 3 is a partial sectional view of the loop or band of FIG. 1 showing the attachment or joinder of the extension therefrom.

As shown in FIG. 3 the extension 12 may be formed integrally with the band 11 and the substantially rigid strip or rod entirely or partially encased in a tail or the like 14 of the same material as the band. In manufacture the resilient loop or band 11 may be formed as a tube with the tail 14 extending as a rib or the like longitudinally thereof and the strip 13 embedded in the tail. The tube is then sliced transversely to simultaneously form individual bands 11 and extension 12. Alternatively the relatively rigid part of the extension 12 may be bonded to the tail 14 in extension therefrom. For certain applications it is preferable to encase all or most of the relatively rigid material to minimize possible abrasion by or deterioration of the substantially rigid material.

Figure 4:
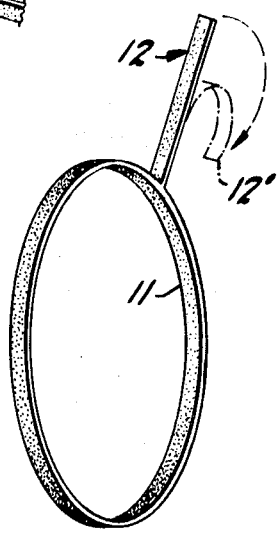
FIG. 4 is a perspective view of the unit of FIG. 1.
Figure 5:
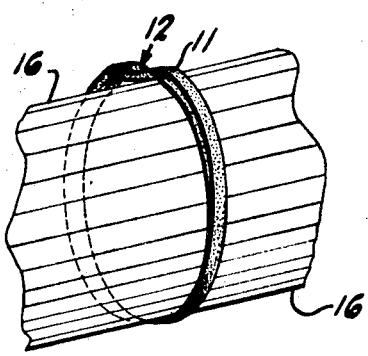
FIG. 5 is a diagrammatic illustration of the unit of the present invention in an engagement about a plurality of elements to be joined together.

As shown in FIGS. 4 and 5, the resilient loop 11 has the strip or projection 12 extending from an exterior surface thereof and this projection 12 is capable of being bent, as indicated at 12' of FIG. 4, to form a hook. This hooked extension is capable of attachment to the opposite side of the band 11 in order to join together opposite sides of the band about some material to be held together. This foregoing is illustrated in FIG. 5 wherein it will be seen that the band 11, doubled over as indicated, is stretched about some elements 16 which are intended to be held together or fastened by the present invention. With the loop resiliently or elastically extended about these elements 16, two looped ends of the band or loop are disposed in contiguous relation and the projection 12 is then slipped through the opposite looped end of the band and bent back in the manner illustrated at 12' of FIG. 4 to thus secure the two ends of the band together about the member 16.

Figure 6:
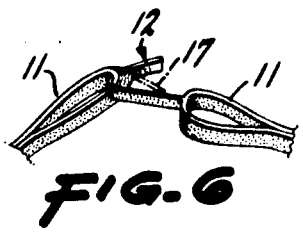
FIG. 6 is an enlarged partial view of the joinder of ends of the unit of FIG. 1 as may be employed in utilization of the invention as illustrated in FIG. 5.

With regard to the actual operation of joining together opposite ends of the doubled band 16 as it may be extended about elements to be joined together, reference is made to FIG. 6. It will be appreciated that a rubber band or the like does not have free ends which are available for joinder about elements so as to be tied or otherwise joined together. In fact prior art attempts at providing a single strip of elastic material such as rubber as a fastening means has proven relatively impractical because of the difficulty of joining the ends together when the strip is resiliently extended. It has, in fact, been found that a practical approach to the provision of resilient joinder means lies in the form of a loop or band of resilient material such as that commonly termed a rubber band. The disadvantage of this configuration is the impossibility under many circumstances of slipping the band over the end of elements to be fastened or joined together thereby. In many instances elements to be fastened together have enlarged ends and consequently a rubber band that would resiliently clamp the center thereof together cannot be sufficiently extended to slip over the ends. The present invention utilizes the proven capability of an endless loop of resilient material such as a rubber band, while at the same time providing for extending such a band about a small central diameter of elements to be joined together and connecting the contiguous looped ends of the band thereat.

Again referring to FIG. 6, it will be seen that the two looped ends of the band 11 are shown to be disposed adjacent each other in extension about some elements to be resiliently fastened together by the present invention. The extension of strip 12 extending from an outer surface of the band is placed through the opposite looped end of the band and is then manually bent over about the band material 11 into the form of a hook so as to retain the two band ends in the position shown. It is also possible to further bend this projection or strip 12 so as to form thereby a closed loop such as indicated by the dashed lines at 17 of FIG. 6. This, then, ensures full retention of the band ends in illustrated position, for under no circumstances would it then be possible for one looped end of the band to slip from the strip or projection 12. As a practical matter the material of the extension of strip 12 may be formed of a limitedly deformable metal, for example, having somewhat the same properties as the material of a paper clip, for example. While it is possible to bend over the outer end of the projection 12 by finger pressure, it is not possible for the resilient tension of the loop 11 to unbend or straighten out the projection 12 once it has been bent over. This limited flexibility of the extension 12 provides the further capability of closing the hook end to wrap the projection entirely about the opposite looped end of the band 11 and thus lock together the two ends of the band even under those extreme circumstances wherein some movement or contraction of the elements gripped by the band may in fact release the band tension. With the strip or projection 12 bent entirely about so that the outer end touches the inner end or some portion adjacent same, it will be seen that there is formed the equivalent of a ring 17 fully and completely locking together the looped ends of the band 11.

There has been described above a preferred embodiment of the present invention with at least a general indication of the operation and utilization of this invention. It is emphasized that the invention hereof is extremely simple both with regard to manufacture and utilization. There is yet, however, provided by this invention capabilities unavailable with prior art devices falling in this general field. The limitedly flexible nature of the projection or strip extending from an outer surface of the elastic band or loop affords the user certain capabilities not available with prior art devices. Thus, for example, any desired amount or length of the projection 12 may be bent back to form a connecting hook and this, then, provides an added control over the total length of the unit in extension about elements to be held together thereby. Additionally the degree of hook bending is controlled by the user so as to merely form the hook configuration illustrated in FIG. 6 or to form a complete locking ring, such as also illustrated in FIG. 6.

While the invention has been described above in connection with a single preferred embodiment thereof, it is not intended to limit the invention to the precise terms of description or details of illustration. Reference is made to the appended claims for a definition of the invention.

I claim:

1. An elastic hook band comprising an endless loop of elastic material and an extension from the outer surface of said loop, said extension having a hook shape and comprising a metal strip embedded in the material of said loop and extending outwardly from the loop thereof and turned back toward the loop to form said hook shape by means of which said loop may be elastically stretched about elements and a loop end engaged with the hook.

2. An elastic hook band comprising a closed loop of elastically deformable material capable of being stretched about elements to be held together thereby and a limitedly deformable nonresilient strip permanently attached to and extending from an outer surface of said loop and adapted to extend through a loop end and be then bent back toward the loop surface from which it extends to join together ends of a loop extended about elements to be joined together.

3. The band of claim 2 further defined by said strip being deformable to the extent of being bent into a closed ring.

4. The band of claim 2 further defined by said strip and loop having the same width.

5. The band of claim 2 further defined by said strip extension comprising a substantially rigid element extending outwardly from said loop and the material of said loop extending outwardly about at least a part of said element.